(12) United States Patent
Jacob et al.

(10) Patent No.: US 8,990,809 B1
(45) Date of Patent: Mar. 24, 2015

(54) CREATING A VIRTUAL APPLIANCE USING EXISTING INSTALLATION MANIFEST

(71) Applicant: Flexera Software LLC, Itasca, IL (US)

(72) Inventors: Jiju Jacob, Bangalore (IN); Sandip Sethuram, Bangalore (IN)

(73) Assignee: Flexera Software LLC, Itasca, IL (US)

( * ) Notice: Subject to any disclaimer, the term of this patent is extended or adjusted under 35 U.S.C. 154(b) by 0 days.

(21) Appl. No.: 14/312,604

(22) Filed: Jun. 23, 2014

(51) Int. Cl.
*G06F 9/455* (2006.01)
*G06F 9/445* (2006.01)

(52) U.S. Cl.
CPC .............. *G06F 9/45533* (2013.01); *G06F 8/61* (2013.01); *G06F 2009/45595* (2013.01); *G06F 2009/45575* (2013.01)
USPC ............................................................ 718/1

(58) Field of Classification Search
CPC ............. G06F 2009/45575; G06F 2009/45595
See application file for complete search history.

(56) References Cited

U.S. PATENT DOCUMENTS 7,533,114 B2 * 5/2009 Neil et al. .............................. 1/1
2009/0328225 A1 * 12/2009 Chambers et al. ............... 726/26

* cited by examiner

*Primary Examiner* — Camquy Truong
(74) *Attorney, Agent, or Firm* — Michael A. Glenn; Perkins Coie LLP

(57) ABSTRACT

Technology is disclosed for generating a virtual appliance ("vApp") for an application using an existing installation manifest of the application. The installation manifest can be part of a traditional installation package that is used to install the application on a computer system. The installation manifest contains configuration information for installing the application using the installation package. A vApp builder analyzes the installation manifest to identify and/or determine various configuration information of the application that may be required to generate the vApp. The configuration information can include information regarding the application components of the application, packages/dependencies on which the execution of the application components depend, an operating system on which the application components and/or their packages execute. The vApp builder generates the vApp using the information obtained from the installation manifest. The vApp can be executed as a virtual machine on a host computer system with a supporting hypervisor.

26 Claims, 9 Drawing Sheets

Pseudo-Code representing an Installation Manifest File

Product Name = XYZ Shopping Center
Product Version = 1.0.0.0
Product GUID = <UUID of the product>
Pre-Requisites: .Net framework, Java, other runtimes required for each layer to work along with their exact version

Constituent Layers:
1. Web-Layer -- represented by Apache Tomcat WebServer (no details of the underlying OS present) including the specific version
2. App-Layer -- represented by JBoss (no details of the underlying OS present) including the specific version
3. DB-Layer -- represented by SQL-Server

Constituent Components:
1. Web Layer Component -- represented by a WAR (Web-Archive) or a WebDeploy file along with a deployment plan
2. App Layer Component -- represented by an EAR (Enterprise-Archive) or a WebDeploy file along with a deployment plan
3. DB Layer Component -- represented by SQL scripts that contain the SQL logic of creating and populating the schemas that correspond to the DB Layer.

Configuration Entries:
1. Configuration Entries that configure the App Server with the details of the database (e.g., sets of actions that configure a deployment descriptor of the App-Server with the details of the database)
2. Configuration Entries that configure the Web Server with the details of the App-Server (e.g., set of actions that configure a deployment descriptor of the App-Server with the details of the database)
3. Configuration Entries that configure the App Server with the details of the back-office systems for facilitating communication between the App-Server and the back office systems

*FIG. 3*

| vApp Layer Property | Set automatically by vApp Builder | Comments |
| --- | --- | --- |
| OS | Mostly yes | In most cases, based on the software that is being installed into a given layer, the vApp Builder can determine a suitable JeOS.<br>In some cases, if the vApp Builder fails to recognize this, the option would be available to the user, e.g., ISV, to configure the same. |
| Hardware Properties | Mostly yes | The hardware is set to a default value, as this may not available in the installation manifest |
| Packages & Dependencies | Mostly yes | Some information about the packages required is present in the manifest. However, the manifest was initially authored with the assumption that the OS itself will satisfy many dependencies, which might not be true all the time.<br><br>The vApp Builder has intelligence to identify the required dependencies of most of common application, web and DB servers and uses the intelligence to automatically include packages.<br><br>The vApp Builder can also communicate with third party applications, e.g., package manager (such as rpm – redhat package manager, or yum) to verify its package and dependency decisions and to automatically include any missed packages |
| Payload Files | Mostly yes | Can be determined from the manifest |
| Configuration steps for the vApp layer | Mostly yes | Can be determined from the manifest<br><br>The vApp Builder is also configured to include some default first boot, first login, subsequent boot and subsequent login scripts that configure the credentials for every vApp layer.<br><br>The vApp Builder also makes provision for the user, e.g., ISV, to define additional scripts that need to be executed at the first boot, first login, subsequent boot and subsequent login. |

*FIG. 4*

CREATING A VIRTUAL APPLIANCE USING EXISTING INSTALLATION MANIFEST

BACKGROUND

A virtual appliance (vApp) is a pre-built, pre-configured, ready to run application solution that is packaged along with an optimized operating system (OS) called as Just enough Operating System (JeOS). A vApp caters to delivering a single business service and can be composed of (a) a single virtual machine (VM) containing all the business services, (b) multiple VM's or (c) VM collections that collectively service the business need. A vApp can be deployed using a supporting hypervisor or a VM manager, e.g., vSphere/vCenter from VMWare of Palo Alto, Calif. vApps have been gaining a lot of popularity with the advent of cloud computing. Many Independent Software Vendors (ISVs) are interested in creating vApps for distributing their software over the cloud. Most of these ISVs typically distribute the software by creating traditional installation packages for the software. Distributing software using traditional install packages typically is a daunting task for the ISVs. Installation and configuration can take hours and days and yet there might be several configuration problems that can cause a bad software experience or even elevated support costs.

In today's world, there are different organizations that have different sets of hardware and operating system (OS) resources. The organizations expect the ISVs to be able to configure the software to execute on the existing hardware and OS resources. This can cause considerable strain to the ISV—the ISV has to test and certify the same software on different platforms. vApps can eliminate these problems as the customer may not be even aware of the underlying platform, as the service is just hosted on a hypervisor. This can in-turn result in reduced testing matrix of supported platforms for the ISV. However, the infrastructure of the ISVs is typically focused towards creating traditional installation packages. If the ISVs have to build a vApp for their software, they have to build the vApp anew, which can consume significant resources.

SUMMARY

Technology is disclosed for generating a virtual appliance for an application using an existing installation manifest of the application ("the technology"). In some embodiments, the installation manifest is part of a traditional installation package that is used to install the application on a computer system. The installation manifest contains configuration information for installing the application. The technology includes a virtual appliance (vApp) builder that generates a vApp for the application. The vApp builder analyzes the installation manifest to identify and/or determine various configuration information of the application that may be required to generate the vApp for the application. The configuration information can include information regarding the application components/files of the application. In another example, it can include information regarding packages or dependencies (collectively referred to as "packages") of the application components that may be required for the execution of the application components. In yet another example, it can include information regarding operating system (OS) on which the application components and/or their packages execute. In some embodiments, the packages or dependencies are associated applications, including third party applications that may be required for the application files to execute.

After determining the configuration information from the installation manifest, the vApp builder obtains the necessary entities based on the configuration information and generates the vApp. If the application is configured as a multi-layer application, then the vApp builder obtains the configuration information for each of the layers, and generates a multi-layer vApp for the application. In a multi-layer application, the layers, e.g., application server-layer, web server-layer, database-layer, etc., perform a distinct function of the application. Each of the vApp layers (also referred to as "VM layers") can act as a virtual machine (VM) or a set of VMs when the vApp is deployed in a host computer system. The configuration information obtained from analyzing the installation manifest may be presented to a user, e.g., an independent software vendor (ISV) who is generating the vApp, for further customization of any of the properties of the vApp. For example, the ISV may select a different OS from that of the OS determined by the vApp builder. Note that the user can be the ISV, a consumer—for whom the ISV generates the vApp for, or any other entity that builds, deploys and/or maintains the vApp. The document uses "ISV" as an example of the user. However, it should be noted that the user is not limited to the ISV and can include any entity that builds, deploys and/or performs maintenance operations on the vApp.

After the vApp builder generates the vApp, the vApp builder can deploy the vApp on the host computer system. The vApp can execute as one or more VMs on a hypervisor of the host computer system. The vApp can execute on a variety of operating systems, such as Microsoft Windows, Linux. The host computer system can be a cloud computing service, e.g. a private cloud, such as vCloud from VMWare, or a public cloud, such as Amazon/Eucalyptus.

BRIEF DESCRIPTION OF THE DRAWINGS

FIG. 3 is an example representation of the installation manifest of a user application such as a shopping cart application.

FIG. 4 is a vApp layer definition object containing a set of properties of a vApp layer.

DETAILED DESCRIPTION

Figure 1:
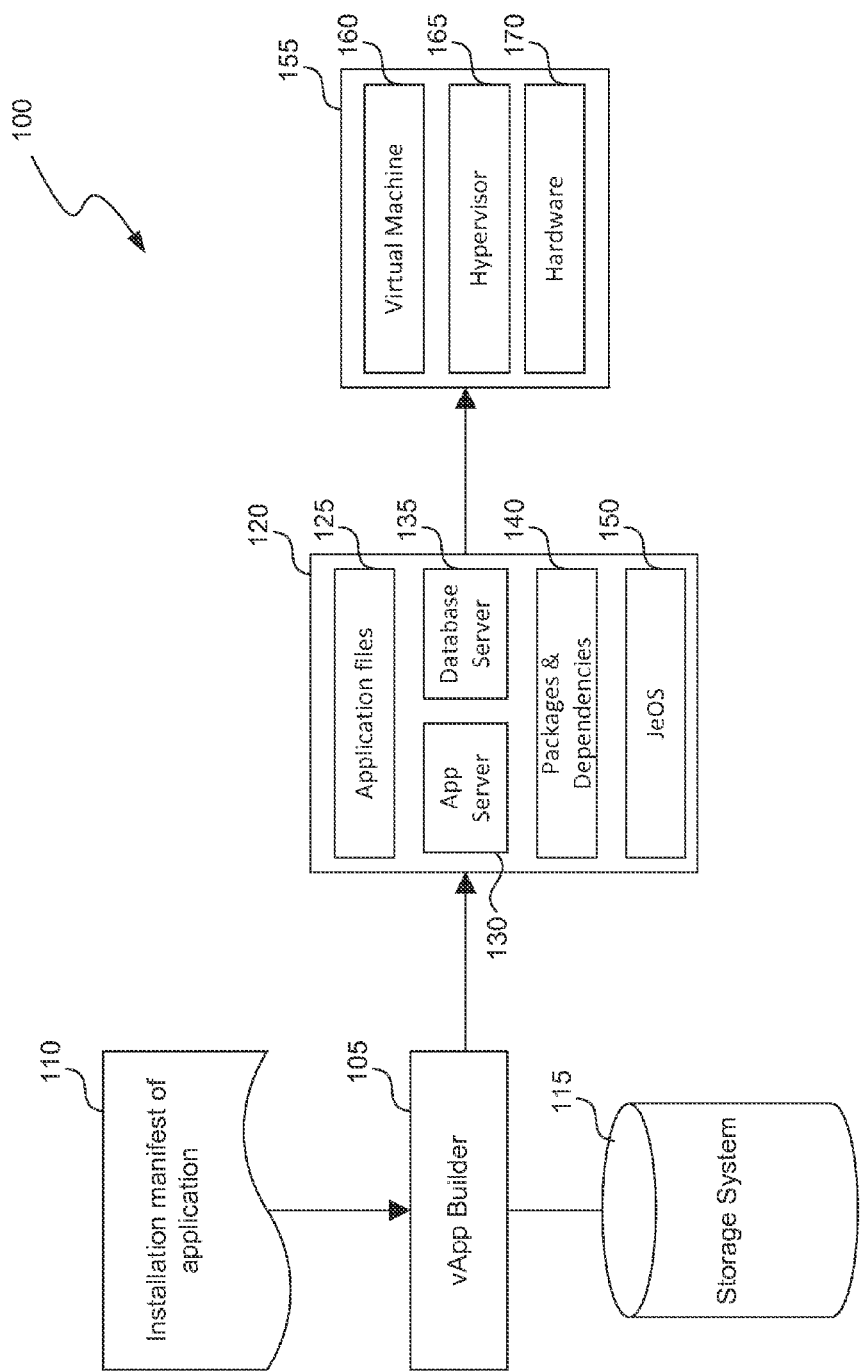
FIG. 1 is a block diagram illustrating an environment in which a virtual appliance ("vApp") builder for generating a vApp can be implemented.

Technology is disclosed for generating a virtual appliance for an application using an existing installation manifest of the application ("the technology"). In some embodiments, the installation manifest is part of a traditional installation package that is used to install the application on a computer system. The installation manifest contains configuration information for installing the application using the installation package. The technology includes a virtual appliance (vApp) builder that generates a vApp for the application. The vApp builder analyzes the installation manifest to identify and/or determine various configuration information of the application that may be required to generate the vApp for the application. The configuration information can include information regarding the application components/files of the application. In another example, it can include information regarding packages or dependencies (collectively referred to as "packages") of the application components that may be required for the execution of the application components. In yet another example, it can include information regarding operating system (OS) on which the application components and/or their packages execute. In some embodiments, the packages or dependencies are associated applications, including third party applications that may be required for the application files to execute.

After determining the configuration information from the installation manifest, the vApp builder obtains the necessary entities based on the configuration information and generates the vApp. If the application is configured as a multi-layer application, then the vApp builder obtains the configuration information for each of the layers, and generates a multi-layer vApp for the application. In a multi-layer application the layers, e.g., application server-layer, web server-layer, database-layer, etc., perform a distinct function of the application. Each of the vApp layers (also referred to as "VM layers") can act as a virtual machine (VM) when the vApp is deployed in a host computer system. The configuration information obtained from analyzing the installation manifest may be presented to a user, e.g., an independent software vendor (ISV) who is generating the vApp, for further customization of any of the properties of the vApp. For example, the ISV may select a different OS from that of the OS determined by the vApp builder, Note that the user can be the ISV, a consumer to who the ISV generates the vApp for, or any other entity that builds, deploys and/or maintains the vApp. The document uses "ISV" as an example of the user. However, it should be noted that the user is not limited to the ISV and can include any entity that builds, deploys and/or performs maintenance operations on the vApp.

After the vApp builder generates the vApp, the vApp builder can deploy the vApp on the host computer system. The vApp can execute as one or more VMs on a hypervisor of the host computer system. The vApp can execute on a variety of operating systems, such as Microsoft Windows, Linux. The host computer system can be a cloud computing service, e.g. a private cloud, such as vCloud from VMWare, or a public cloud, such as Amazon/Eucalyptus.

Environment

FIG. 1 is a block diagram illustrating an environment 100 in which the vApp builder can be implemented. The environment 100 includes a vApp builder 105 that is used to generate a vApp 120 for a user application. The user application can be any application, e.g., a shopping application that can be executed on one or more computing devices. In some embodiments, the vApp 120 is a pre-built, pre-configured, self-contained virtual image that is generated by combining the user application with an optimized OS, such as Just enough Operating System (JeOS), for the user application to execute on a VM. The vApp 120 caters to delivering a single business service and can be composed of (a) a single VM containing all the business services, (b) multiple VM's or (c) VM collections that collectively service the business need.

The vApp 120 can be executed on the VM 160 hosted on a host computer system 155. The host computer system 155 includes a hypervisor 165 that facilitates the execution of the vApp 120 as the VM 160 or collections of VMs 160. A hypervisor is a computer software, firmware or hardware that creates and runs virtual machines. In some embodiments, the hypervisor 165 is software executing on the hardware 170 of the host computer system 155. The VM 160 is also called a guest machine. The hypervisor 165 presents the OSs of the VM 160 with a virtual operating platform and manages the execution of the vApp 120. The vApp 120 can execute on a variety of operating systems, such as Microsoft Windows, Linux. The host computer system 155 can be a cloud computing service, e.g. a private cloud, such as vCloud from VMWare, or a public cloud, such as Amazon/Eucalyptus.

The vApp builder 105 can be realized as software, hardware or a combination thereof. The vApp builder 105 facilitates generation of the vApp 120 for the user application using the installation manifest 110. The installation manifest 110 is part of an installation package of the user application. In some embodiments, the installation package is an application, e.g., an InstallShield (a product of Flexera Software LLC, Itasca, USA) installer, that installs or transfers the files and other entities of the user application to a physical or virtual machine. The installation manifest 110 is a file containing information that defines the files and other entities and their settings or configuration information needed to build an installation package for the user application. The installation package can then be used as a stand-alone application to install the user application on one or more computing devices.

The vApp builder 105 receives the installation manifest 110, e.g., from a user such as an ISV. The vApp builder 105 determines from the installation manifest 110 whether to generate a single layer or multi-layer vApp for the user application. The user application can have multiple application layers where each application layer performs a distinct business function. For example, a user application such as a shopping application can include an application layer that includes business logic for operations such as computation of price and/or discounts of various products, order management, vendor management etc. The shopping application can include a second layer such as database layer that performs persistence operations for storing data associated with the shopping cart application in a storage system. The shopping application can further include a third layer such as web layer that performs a function such as presentation of data, e.g., in a web page, to the end users.

If there are multiple application layers in the user application, the vApp builder 105 determines that the vApp 120 has to be generated as a multi-layer vApp. For example, the vApp 120 is a multi-layer vApp which includes a first vApp layer 130 that corresponds to application server layer and a second vApp layer 135 that corresponds to a database-layer. For each of the layers of the user application, the vApp builder 105 determines the application components/the application files 125 (also referred to as "payload components/files") that represent the user application. The vApp builder 105 also identifies any packages/dependencies 140 that are required for the execution of the application files 125. The vApp builder 105 identifies the packages 140 by analyzing the information from the installation manifest 110 and/or by using predefined dependency policies that are configured by a user, e.g., the ISV, at the vApp builder 105. The predefined dependency policies may be stored at a storage system 115 associated with the vApp builder 105. Also each layer may be implemented as a single VM or a collection of VMs. For example—the Application Layer might be a collection of three (3) VMs, whereas the DB layer might just be a single VM Further, the vApp builder 105 also identifies an OS with which the application files and the packages of each of the application layers are compatible. If more than one OS is compatible, the vApp builder 105 may select one of the OSs based on predefined OS selection policy configured by a user, e.g., the ISV. The predefined OS selection policies may be stored at the storage system 115. In some embodiments, the ISV may specify the OS for each of the vApp layers. The OS can be an optimized OS such as JeOS 150. In some embodiments, JeOS refers to a customized OS that fits the needs of a particular application. The JeOS may only include the pieces of an OS (e.g., kernel) required to support the particular application and any other third-party components contained in a vApp. In some embodiments, the JeOS 150 can make the vApp 120 smaller in size, and possibly more secure than the user application running under a full general-purpose OS.

After the vApp builder 105 generates determines the configuration information, which includes information regarding the application files, the packages and the JeOS, for generating the vApp, the vApp builder 105 presents the configuration information to the ISV. The ISV may further customize the configuration of the vApp 120. For example, the ISV can change the JeOS for a particular vApp layer, add or remove packages. After the ISV reviews the configuration information, the vApp builder 105 obtains all the entities based on the configuration information and creates the vApp 120, e.g., as a virtual disk image (or) sets of virtual disk images. The vApp builder 105 can also deploy or install the vApp 120 on the host computer system 155.

Figure 2:
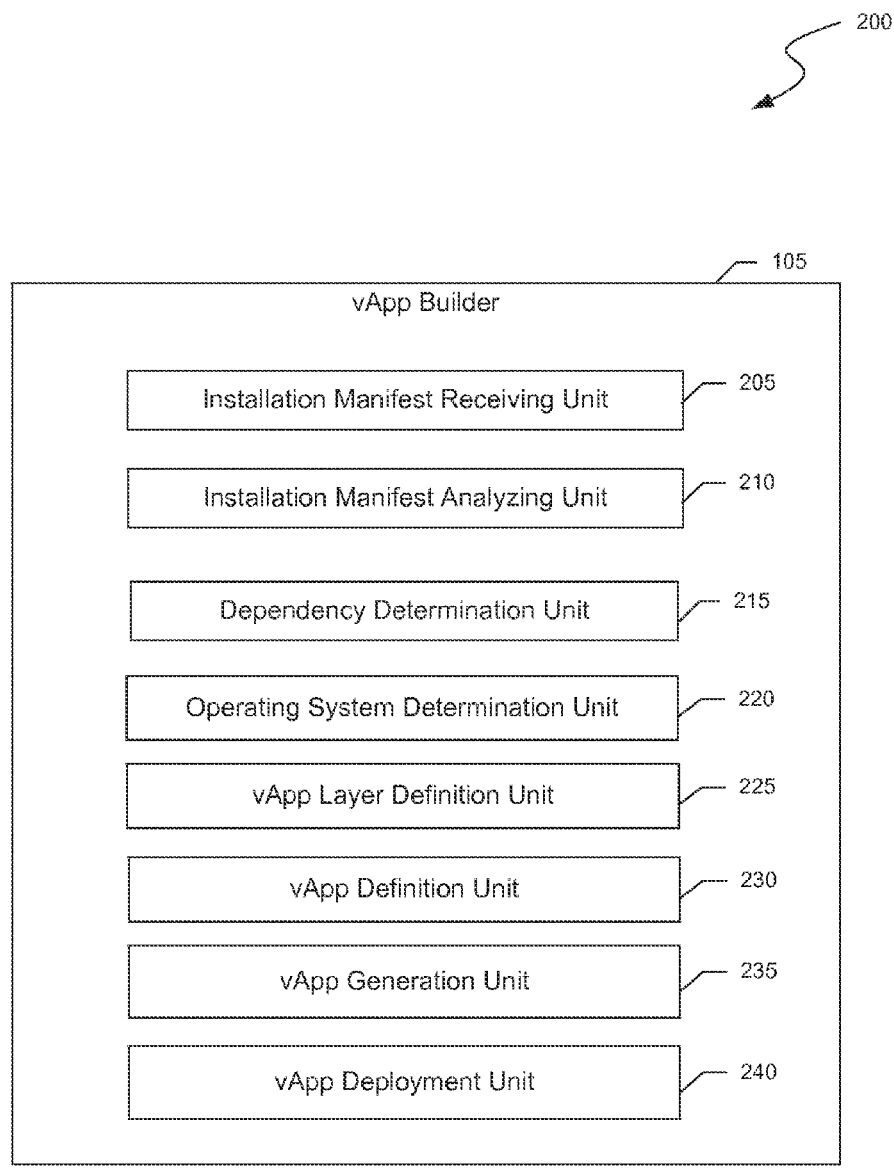
FIG. 2 is a block diagram of the vApp builder that facilitates generation of a vApp for a user application.

FIG. 2 is a block diagram of the vApp builder 105 that facilitates generation of a vApp for a user application. The vApp builder 105 includes an installation manifest receiving unit 205 that receives the installation manifest 110 of the installation package of the user application. A user, such as an ISV, who is building the vApp for the user application can input the installation manifest 110 to the vApp builder 105. In some embodiments, the ISV may input an installation package and the vApp builder 105 can extract the installation manifest 110 from the installation package.

As described above, the installation manifest 110 is a file containing information that defines the files and other entities and their settings or configuration information needed to build an installation package for the user application. FIG. 3 is an example representation 300 of the installation manifest 110 of a user application such as a shopping cart application. The installation manifest 110 can be implemented in a number of formats, including extensible markup language (XML). The example representation 300 represents the installation manifest 110 in a pseudo code format for the sake of convenience of description. The installation manifest 110 can have the necessary information organized in a different format from that of the example representation 300, e.g., the necessary information can be spread across more sections or lesser sections than that in the example representation 300, the sections can have different names, etc.

The example representation 300 of the installation manifest 110 includes product information 305, such as a name, version, universally unique identifier (UUID) of the user application, and packages required for execution of the application files. For example, the product information 305 specifies that .NET framework and Java are pre-requisites for the shopping cart application. The example representation 300 includes application layer information 310 such as names of various layers of the user application. For example, the application layer information 310 specifies that the shopping cart application includes multiple application layers such as a web layer, an application layer and a database layer. The example representation 300 includes application components/files information 315 such as names of various application files of the user application. For example, the application components information 315 specifies that the web layer of the shopping cart application includes application files such as web archive (WAR) file or a deployment descriptor file having instructions for deployment of the shopping cart application.

Similarly, the application components information 315 also specifies that application layer includes application files such as enterprise archive (EAR) file or a web deploy file along with instructions for deployment of the shopping cart application. Similarly, the application components information 315 also specifies that the database layer includes a number of structured query language (SQL) scripts for reading, writing and/or modifying the data containers, e.g., a database, that store data associated with the shopping cart application.

Further, the example representation 300 also includes settings information 320 that provides configuration information for various layers of the user application. For example, the settings information 320 might specify a set of actions that configure a deployment descriptor of the application layer with the details of the database.

Referring back to the vApp builder 105 in FIG. 2, the vApp builder 105 includes an installation manifest analyzing unit 210 to analyze the installation manifest 110. The user application can be a single layer or a multi-layer application. The installation manifest analyzing unit 210 identifies the application layers of the user application and the application files of each of the application layers.

A dependency determination unit 215 analyzes the installation manifest 110 to determine the packages or dependencies of each of the application files of the user application. If the user application is a multi-layer application, then the dependency determination unit 215 determines the dependencies for each of the application layers.

An OS determination unit 220 determines the OS that may be required for each of the application files and/or packages or dependencies. In some embodiments, the installation manifest analyzing unit 210, the dependency determination unit 215 and the OS determination unit 220 may be combined into a single unit and the single unit may perform functions to similar to any of the combined individual units. In some embodiments, the installation manifest analyzing unit 210, the dependency determination unit 215 and the OS determination unit 220 may be combined into a plurality of units.

If the user application is a multi-layer application, the vApp generated for the user application can also be a multi-layer vApp, where each vApp layer of the vApp corresponds to an application layer of the user application. The vApp builder 105 includes a vApp layer definition unit 225 that configures a set of properties of a vApp layer. FIG. 4 is a vApp layer definition object containing a set of properties of a vApp layer. The vApp layer definition object 400 includes vApp layer properties such as (a) an OS for the vApp layer, (b) hardware properties, (c) packages and/or dependencies of the vApp layer, (d) application files of the vApp layer and (e) other configuration information of the vApp layer, e.g., scripts to be executed at certain stages of execution of the vApp (which are described in greater detail with reference to FIG. 6 below).

In some embodiments, the vApp layer definition unit 225 generates a vApp layer definition object such as the vApp layer definition object 400 for each of the vApp layers. Some of the properties in the vApp layer definition object 400 can be set by the vApp builder 105 and some by the ISV. The vApp layer definition unit 225 infers the value of the properties from the installation manifest 110. In some embodiments, the vApp layer definition unit 225 works in cooperation with one or more of the installation manifest analyzing unit 210, the dependency determination unit 215, and the OS determination unit 220 to infer the above properties. Further, the ISV can modify any of the properties determined by the vApp builder 105.

Figure 5:
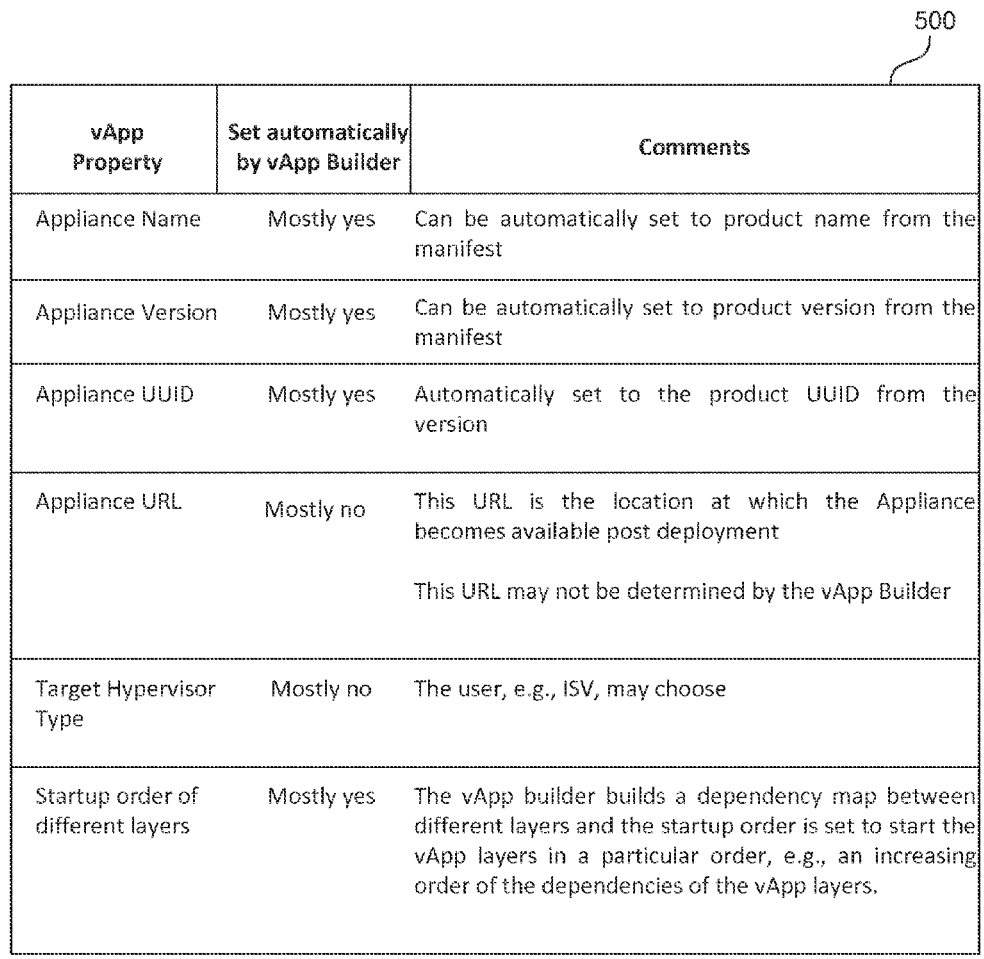
FIG. 5 is a vApp definition object containing a set of properties of a vApp.

Referring back to the vApp builder 105 in FIG. 2, the vApp builder 105 includes a vApp definition unit 230 that configures a set of properties of the vApp 120. FIG. 5 is a vApp definition object containing a set of properties of a vApp, such as the vApp 120. The vApp definition object 500 includes vApp properties such as a name, version, and UUID of the vApp. The vApp definition object 500 also includes properties such as a type of a hypervisor on which the vApp is hosted and a uniform resource locator (URL) at which the vApp is accessible. Further, if the vApp is a multi-layer vApp, the vApp definition object 500 also includes properties such as a start order and stop order of the vApp layers of the vApp.

Some of the properties in the vApp definition object 500 can be set by the vApp builder 105 and some by the ISV. For example, the value of the properties such as name, version, UUID of the vApp and start and stop order of vApp layers of the vApp can be set by the vApp builder 105. The vApp definition unit 230 infers the value of the properties from the installation manifest 110. In some embodiments, the vApp definition unit 230 works in cooperation with one or more of the installation manifest analyzing unit 210, the dependency determination unit 215, the OS determination unit 220 and the vApp generation unit 235 to infer the above properties. Some properties such as the type of hypervisor on which the vApp is installed are set by the ISV. Further, the ISV can modify any of the properties of the vApp determined by the vApp builder 105.

In some embodiments, the vApp layer definition object 400 can be included within the vApp definition object 500 and the vApp definition object 500 can have a vApp layer definition object for each of the vApp layers.

The vApp builder 105 includes a vApp generation unit 235 that facilitates the generation of the vApp for the user application. In some embodiments, the vApp is generated as a virtual disk image along with a metadata file. In some other embodiments, the vApp is generated as a set of virtual disk images along with metadata file. The metadata file describes the properties of the vApp which can be used by a deployment unit to deploy the vApp to a host computer system (which hosts a hypervisor). The vApp builder 105 includes a vApp deployment unit 240 that can deploy or install the vApp on a specified location such as the host computer system 155. Additional details with respect to generating the vApp are described with reference to FIG. 6 below.

Figure 6:
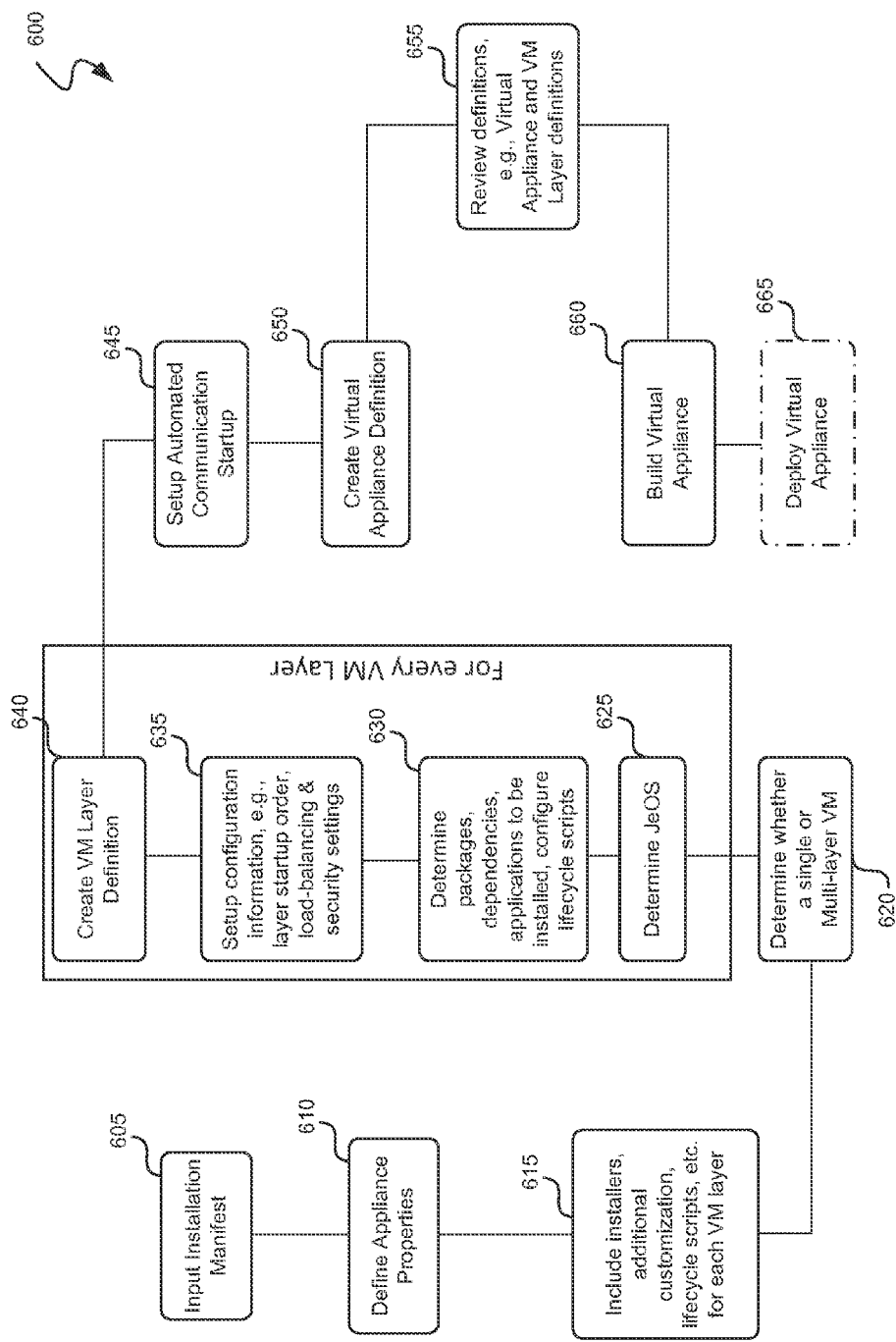
FIG. 6 is a process for generating a vApp for a user application using an installation manifest of an existing installation package of the user application.

FIG. 6 is a process 600 for generating a vApp for a user application using an installation manifest of an existing installation package of the user application. The process 600 may be implemented in an environment 100 of FIG. 1. At block 605, the installation manifest receiving unit 205 receives an existing installation manifest, such as the installation manifest 110, of an installation package of a user application. A user, such as an ISV, who is budding the vApp, can input the installation manifest 110 to the vApp builder 105.

At block 610, the vApp layer definition unit 225 and/or the vApp definition unit 230 receives some of the properties of the vApp from the ISV, such as the URL where the vApp would be deployed, a type of the hypervisor and a template of a VM on which the vApp would be deployed, etc. The vApp can execute on a number of environments such as a Windows or Linux desktop class machine, and the vApp builder 105 may need access to the hypervisor platform on which the vApp is intended to be executed. For example, if one of the vApp layers runs on a Linux OS and if the vApp is being built for VMWare hypervisor, the vApp builder 105 can use application programming interface (API) from VMWare (VMware vSphere API) to provision a temporary VM in the hypervisor infrastructure, then install the JeOS of the Linux OS, install the various packages and install the application files and thus build the entire virtual disk image of the vApp. If the vApp is being built for Amazon, the vApp builder uses Amazon AWS (Amazon Web Services) API to build the virtual image disk.

At block 615, the vApp layer definition unit 225 and/or the vApp definition unit 230 receives further information such as lifecycle scripts (which are described in further detail in the following paragraphs) from the ISV, which perform a number of operations at different stages of execution of the vApp. In some embodiments, the vApp generation unit 235 can generate the lifecycle scripts based on the analysis of the installation manifest 110. However, the ISV can also provide these lifecycle scripts or provide other scripts in addition to the scripts generated by the vApp generation unit 235.

At block 620, the installation manifest analyzing unit 210 analyzes the installation manifest 110 and determines whether the vApp to be generated is a single layer or multi-layer vApp. For example, if the installation manifest 110 contains only a single layer of the user application, then the vApp is also generated as a single layer vApp. If the installation manifest 110 contains multiple layers, then the vApp will also be generated as a multi-layer vApp. In some embodiments, each of the vApp layers is executed as a separate VM. So a multi-layer vApp can execute as a multi-VM vApp.

Additionally, the ISV can add or remove vApp layers once the vApp definition is inferred from the installation manifest. However, if the ISV has decided to add a vApp layer to the vApp, then the ISV may have to ensure that the corresponding properties for the vApp layer are set appropriately. If the ISV has removed a vApp layer from the vApp definition, then this can cause a break in the dependencies, which the ISV has to update in the vApp definition accordingly.

At block 625, the OS determination unit 220 analyzes the installation manifest 110 to identify the constituent application files on each application layer, and determines based on predefined OS selection policies a JeOS that is best-fit for the application layer. For example, if the user application is a shopping cart application, the database layer can be a SQL server machine, and therefore a JeOS such as Microsoft Windows is selected while analyzing the installation manifest 110 to generate a vApp layer definition for the layer corresponding to the database layer. In some embodiments, the OS selection policies may be defined by the ISV.

In some cases the application files can execute on more than one type of JeOS. For example, the web layer of the shopping application can use Apache Tomcat, which can be installed on either Microsoft Windows or Linux JeOS. In some embodiments, the OS determination unit 220 identifies the packages and/or dependencies of the application layer, such as configuration scripts accompanying the layer that offers additional clues to the intended JeOS on which the resulting vApp layer is to be installed. For example, if there are packages or dependencies that are native, such as a DLL, or EXE or a batch file, or a shell script, or rpms, these are taken into consideration for determining the best-fit JeOS. If no such additional clues are available, then the OS determination unit 220 identifies based on the best fit policies defined by the ISV.

Further, the ISV can also define licensing restrictions that apply with different JeOS in the OS selection policies. For example, Ubuntu & CentOS distributions of Linux are friendly to shipping the JeOS along with the vApps generated using the vApp builder 105. Others such as Red hat might not support third party re-distribution of the JeOS. In such cases, the ISV who has the license to the JeOS can package the JeOS with the vApp manually.

At block 630, the dependency determination unit 215 analyzes the installation manifest 110 to determine the packages that may be required for the application files to execute. The installation manifest 110 may contain some information about the packages required, e.g., in the product information 305 section or in the settings information 320 section of the example representation 300. However, since the installation manifest 110 was initially authored for a traditional installation of the user application, the installation manifest 110 may have been authored with the assumption that the OS itself will satisfy many dependencies of the user application. So, in some cases the installation manifest 110 may not have information regarding the dependencies or the packages. However, the dependency determination unit 215 has a number of predefined dependency determination policies that can be used to determine the dependencies of various types of user applications. In some embodiments, the ISV defines the dependency determination policies.

For example, if there is a shell script in the installation manifest 110, e.g., in the settings information 320 section, that refers to a package called "unzip," then the dependency determination unit 215 determines the unzip package for the JeOS as a dependency. In another example, if installation manifest 110 includes information regarding a java based web layer or application layer, then the dependency determination unit 215 determines java runtime environment (JRE) as a dependency for the web layer or the application layer. In still another example, if installation manifest 110 includes Apache Tomcat as one of the application files in the web layer of or the application layer, then the dependency determination unit 215 determines JRE as a dependency for the web layer or the application layer. In yet another example, if installation manifest 110 includes SQL server, then a .Net framework which can be required to execute the SQL server, is automatically added as a dependency.

In some embodiments, the dependency determination unit 215 includes one or more packages, such as secure file transfer (SFTP) and secure shell (SSH) packages in the vApp by default, e.g., for administrative purposes. The ISV can specify the default packages to be included in the vApp in the dependency determination policies.

In some embodiments, the dependency determination unit 215 can communicate with third party applications, such as Red Hat package manager or Yellowdog update manager (yum), to determine and/or verify the packages and dependencies determined by the dependency determination unit 215. Based on the verification, the dependency determination unit 215 can automatically include any missing packages and update the vApp layer definition accordingly. In some embodiments, the vApp builder can communicate with the third party applications over a communication network, such as Internet.

Further, the installation manifest analyzing unit 210 identifies the application components/files representing the user application to be included in the vApp and also a set of actions to be performed to install a particular vApp layer. The installation manifest 110 can include information regarding the application files and the set of actions, e.g., in the application components information 315 section. The installation manifest analyzing unit 210 obtains the information and the set of actions and updates the vApp layer definition accordingly. For example, the web layer of the shopping application might have a WAR file that needs to be deployed on the Tomcat server. The web layer may have to update a few xml files, etc. All these actions are updated in the vApp layer definition. In another example, the database layer might have a set of SQL scripts that create the schema of the database the shopping application may use. This action is specified in the vApp layer definition of the vApp layer corresponding to the database layer, so that the vApp generation unit 235 can apply this action when the vApp generation unit 235 builds the vApp.

The vApp layer definition unit 225 can configure the life-cycle scripts. In some embodiments, every vApp layer has a set of life cycle scripts. These life cycle scripts include (a) a first boot script, (b) a first login script, (c) a subsequent boot script, (d) a subsequent login script, and (e) a shutdown script. The lifecycle scripts contain a set of operations to be performed at various stages of execution of the vApp. A vApp has various phases or stages of execution. For example, a first boot phase is the phase when a particular vApp layer (also referred to as "VM layer") is booted for the first time. A first login phase is the first time a particular VM layer is logged into by a user. A subsequent boot phase is a phase where the particular VM layer is booted subsequent to the first time. A subsequent login phase is a phase where the user logs in to a particular VM layer subsequent to the first time. A shutdown phase is a phase where a VM layer is being shut down.

Depending on the type of business service the vApp delivers, there could be different set of operations performed at each of these phases. For example, the first time a VM layer is booted/logged into, a set of operations such as installation of some critical services may have to be performed. A set of operations may have to be performed to let a user, e.g., consumer of the vApp, be able to define an administrator name and administrator password for each of the VM layers. Further, at the time of deployment, a set of operations may have to be performed for regenerating security certificates to safeguard each of these VM layers. The vApp generation unit 235 can generate the first login/boot script having these set of operations. For example, at the time of first login of the shopping application, the installed application services such as Apache Tomcat for web layer or JBoss for the App layer or the SQL server for the database layer need to be started for the first time.

In the subsequent boot and login phases, a set of operations such as restarting a set of required services after the vApp is restarted may have to be performed. For example, when the vApp is shut down, e.g., for yearly maintenance, and then restarted, the vApp may have to restart all the services. The vApp generation unit 235 can generate the subsequent boot and/or login scripts having these set of operations. Similarly, a set of operations such as a graceful shutdown of operations can be done at the shutdown phase.

The vApp generated by the vApp builder 105 can include these lifecycle scripts. Further, all these lifecycle scripts are defined in the vApp layer definition of the corresponding vApp layers. As described above, the vApp layer definition unit 225 and/or vApp generation unit 235 can also receive additional scripts from the ISV that perform other similar operations at various phases of execution of the vApp.

Referring back to the process 600, at block 635, the vApp generation unit 235 can configure other properties for the vApp, such as load balancing and security. The vApp generation unit 235 can configure the load balancing and security of the vApp based on various load balancing and security policies. For example, the vApp generation unit 235 can set up the load balancing policy with the following settings:

Policy type="Least Response Time First"

Minimum Number of instances=1

Maximum number of instance=5

Scale up on trigger of CPU utilization >50% or memory utilization >75%

Scale down on trigger of CPU utilization <10% and memory utilization <20%

The vApp generation unit 235 can be configured to set one of the load balancing policies as a default load balancing policy. The vApp builder 105 provides with an option for the ISV to add additional policies, modify and/or delete existing policies.

Similarly, the vApp generation unit 235 can set up the security settings based on one or more security policies. For example, one of the security settings can be to block all incoming and outgoing communications to/from a particular VM layer with some exceptions. The exceptions can include:
- ports that are used by application components, e.g., if Apache Tomcat configuration file declares port 8080 to be the application port, then port 8080 is not blocked;
- one of the ports, e.g., port 22, is left open for administrators to be able to login to carry out the maintenance activities;

In some embodiments, the vApp generation unit may not itself configure the load-balancing and/or security settings, but can create a definition or metadata using which the user deploying the vApp can further configure the settings.

The vApp generation unit 235 can be configured to set one of the security, policies as a default security policy. The vApp builder 105 provides with an option for the ISV to add additional security policies, modify and/or delete existing security policies. Further, the ISV may define a set of load balancing and/or security policies based on a type of the user application for which the vApp is being built.

Referring back to the process 600, at block 640, the vApp layer definition unit 225 can define the properties of each of the vApp layers of the vApp. In some embodiments, the vApp layer definition unit 225 keeps updating the properties of a particular vApp layer as and when the installation manifest 110 is being analyzed in the vApp builder 105. For example, the vApp layer definition unit 225 continuously updates the vApp layer definition of a particular vApp layer as and when entities such as JeOS, packages, applications, lifecycle scripts, etc., are determined, as described above, for the particular vApp layer. In some embodiments, the vApp layer definition is stored as an in-memory structure, e.g., vApp layer definition object 400.

At block 645, the vApp generation unit 235 generates scripts for setting up communication between the vApp layers of the vApp. In some embodiments, the vApp layers communicate with each other via one or more components, e.g., a communication component and a communication-helper component. A primary vApp layer, which is a layer that has the least dependencies and which is set to start first when the vApp is deployed, can have both the components and the remaining vApp layers include the communication-helper component. Some of the communication parameters that may be needed to setup communication between the vApp layers include Internet protocol (IP) address, port of the other vApp layers, and username and password to access the particular vApp layer.

The vApp generation unit 235 determines for each of the vApp layers (a) a set of incoming dependencies—values of the communication parameters of other vApp layers that a particular vApp layer may require to communicate with the other vApp layers and (b) a set of outgoing dependencies—values of the communication parameters of the particular vApp layer that other vApp layers may require to communicate with the particular vApp layer. For example, for a particular vApp layer, its IP address can automatically become an outgoing dependency. For a particular vApp layer, if it depends on another vApp layer's IP address, the other layer's IP address will become an incoming dependency for the particular vApp layer. After the incoming and outgoing dependencies are determined, the vApp layer definition of the particular vApp layer is automatically updated with the set of incoming and outgoing dependencies.

Whenever the primary vApp layer starts for the first time (i.e., in first boot), one of the scripts generated by the vApp generation unit 235 for setting up the communication between the vApp layers starts the communication component of the primary vApp layer. The scripts associated with each of the layers populate the values of the incoming and outgoing dependencies of the corresponding vApp layer as and when the values become available, e.g., whenever a vApp layer starts (first boot or subsequent boot). The scripts also register the incoming and outgoing dependencies with the communication-helper component of the corresponding vApp layer. Additional details with respect to the communication between various vApp layers using the communication components are described at least with reference to FIG. 7 below.

Referring back to process 600, at block 650, the vApp definition unit 230 generates and/or updates the definition of the vApp. Similar to the vApp layer definition, the vApp definition can be an in-memory representation, e.g., vApp definition object 500, having properties of the vApp, as described above at least with reference to FIG. 5. The vApp definition can also be updated at various stages of building the vApp, e.g., during analysis of the installation manifest 110. The vApp definition also contains the start order and the stop order of the vApp layers. In some embodiments, the start order defines an order in which the vApp layers are started, executed or powered on, when the vApp is started, executed or powered on. In some embodiments, the stop order defines an order in which vApp layers are stopped from execution or powered off, when the vApp is stopped from execution or powered off. In some embodiments, the start order is determined as an ascending order of the number of incoming dependencies of the vApp layers. The stop order can be the reverse of the start order.

At block 655, the vApp generation unit 235 indicates to the ISV that the vApp generation unit 235 is ready to generate the vApp. The ISV can review the generated vApp definition and/or vApp layer definition and edit any settings or properties of the vApp if necessary. For example, the ISV can change the JeOS for any of the vApp layers; change the packages and/or dependencies of any of the vApp layers, etc. In another example, the ISV can change the start and stop orders of vApp layers, choose whether the vApp is generated for a private cloud environment or a public cloud environment, choose whether the vApp builder 105 should deploy the generated vApp to a specified host computer system, etc. Further, the ISV can provide access details, e.g., IP address, port number, credentials, to a hypervisor platform that the vApp generation unit 235 can use to build the vApp.

At block 660, the vApp generation unit 235 generates the vApp based on the vApp definition and the vApp layer definition of each of the vApp layers. In some embodiments, the process of generating the vApp can include the following:

For every vApp layer,
- Building a virtual disk image
- Installing a JeOS on the virtual disk image
- Installing the packages/dependencies
- Installing the application components/files
- Installing the communication-helper component
- Installing the default and user specified lifecycle scripts Initializing the communication-helper component with the list of incoming and outgoing dependencies Installing the communication component in the primary layer Generating a metadata file (e.g., if the vApp is deployed to a private cloud or in environments that support open virtualization format (OVF) format)

Package the virtual disk images (and the metadata file if one is created)

In some embodiments, the process involved in building a vApp for a private cloud is different from that of for the public cloud. With private cloud systems, such as vSphere, vCenter, or vCloud of VMware, the vApp generation unit 235 uses the API published by the private cloud to provision a VM within the hypervisor environment with the requested hardware configuration. The vApp generation unit 235 then creates a bootable storage medium, e.g., a compact disk, with the JeOS system and includes a file, e.g., an answer file, to automate the installation of the JeOS. Powering on the VM with the bootable storage medium results in an automatic installation of the JeOS on a storage medium of the VM on the private cloud. In some embodiments, an answer the is a file that contains all the necessary parameters for installing an application without human intervention.

With public cloud systems, the vApp generation unit 235 uses, similar to the private cloud systems, the API published by the public cloud systems to create a VM on the public cloud system. However in this case, the vApp generation unit 235 can use the pre-provisioned images, such as Amazon machine images (AMI), to create the VM and install the JeOS. In some embodiments, the pre-provisioned images are publicly available for use and already have the JeOS installed on them, e.g., are provided by the JeOS vendors.

After the VM with the JeOS is available, either with the public cloud or the private cloud, the vApp generation unit 235 can perform other operations, including installing packages, application files and other components. In some embodiments, the vApp generation unit 235 performs these operations using a secure shell (SSH) connection with the VM. In case of the private cloud system, the vApp generation unit 235 can use the administrator credentials included in the answer file to establish the SSH connection. In case of the public cloud system, the vApp generation unit 235 can use a SSH certificate file associated with the pre-processed image and available within the user account of the ISV to establish the SSH connection.

In some embodiments, the virtual disk images are packaged with metadata, e.g., when the vApp is to be deployed in the private cloud. In case of the private cloud, the virtual disk images for each VM layer are copied and the vApp definition is converted into an OVF file. The OVF file and the virtual disk images are combined in accordance to the OVF standards to produce the open virtualization architecture (OVA) package. The OVA package can then be used to deploy the vApp in the private cloud.

Referring back to process 600, at block 665, a vApp deployment unit 240 can deploy the vApp to a specified location, e.g., a private cloud or the public cloud. In the case of the private cloud, the vApp deployment unit 240 deploys the vApp using the API of the hypervisor platform, such as vCenter. In case of the public cloud, the virtual image disks are stored on the cloud. The vApp deployment unit 240 obtains reference identification (ID), such as AMI ID in case of Amazon, deploys the vApp using the reference ID. In case of auto-deployment, the vApp deployment unit 240 creates instances of the individual layers, e.g., using the API provided by hypervisor platform such as Amazon API and powers on the vApp layers based on their start order.

In some embodiments, the step of block 665, i.e., deploying the vApp using the vApp builder 105 may be optional. In some embodiments, a consumer, e.g., an entity to which the ISV sells the vApp, can deploy the vApp 120 using means other than the vApp builder 105.

Figure 7:
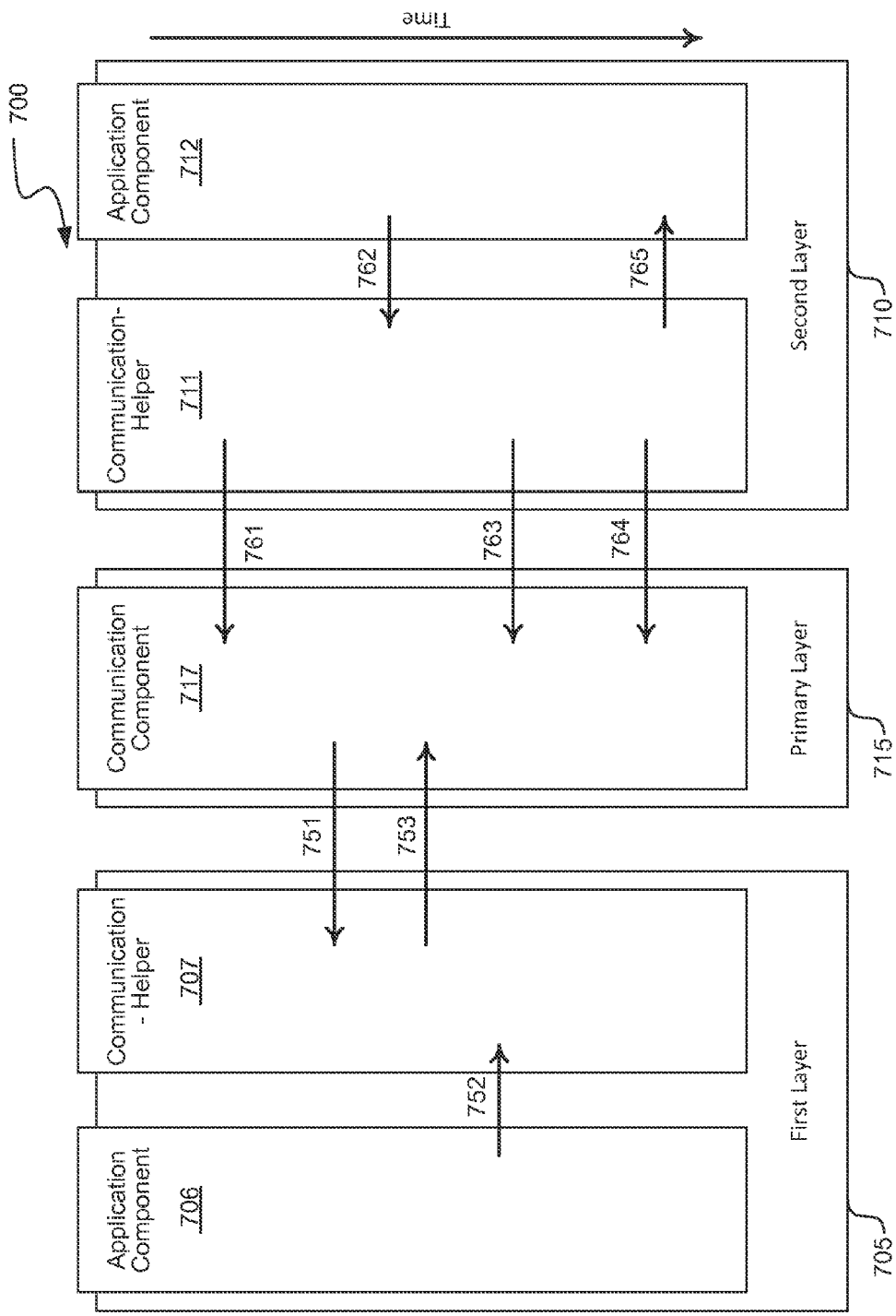
FIG. 7 is a block diagram illustrating a process of communication between various vApp layers of a vApp.

FIG. 7 is a block diagram illustrating a process of communication between various vApp layers of a vApp. In some embodiments, the example 700 may be implemented in environment 100 of FIG. 1. A primary layer is a vApp layer that has least number of incoming dependencies among all the vApp layers of a vApp. The vApp generation unit 235 determines a number of incoming dependencies of each of the vApp layers and constructs a linear order of the dependencies. The vApp layer with the least or zero amount of incoming dependencies is determined as the primary layer, which is configured to be deployed (started or executed) first, and the vApp layer with the most number of incoming dependencies is configured to be deployed at the end. If there are two or more vApp layers which have the same number of incoming dependencies and do not have any dependency relationship between them, then the order of deployment for those vApp layers may not matter and therefore, may be deployed in a random manner.

In the example 700, one of the three vApp layers is the primary layer 715. The primary layer 715 is deployed first, next the first layer 705 and then the second layer 710. When the primary layer 715 is deployed, the primary layer 715 starts executing on the host computer system and the communications component of the primary layer 715 becomes accessible to any of the other vApp layers that start subsequent to the primary layer 715.

At step 751, a first communication-helper component 707 of the first layer 705 discovers the communication component 717 of the primary layer 715 and initializes all registered dependencies.

At step 752, the first application component 706 of the first layer 705 registers the outgoing dependency parameters (such as IP, port etc.) along with their value to the first communication-helper component 707 within the corresponding layer.

At step 753, the first communication-helper component 707 registers the outgoing dependency parameters and their values for the first layer 705 with the communication component 717 of the primary layer 715.

At step 761, when the second layer 710 starts, a second communication-helper component 711 of the second layer 710 discovers the communication component 717 of the primary layer 715 and initializes all registered dependencies.

At step 762, the second application component 712 of the second layer 710 queries the second communication-helper component 711 to obtain the incoming dependency parameter of the first Layer 705.

At step 763, the second communication-helper component 711 requests the communication component 717 of the primary layer 715 for the incoming dependency parameters and their values.

At step 764, the communication component 717 determines if it has the incoming dependency parameters and their values for the first layer 705 and if it has them, the communication component 717 sends them to the second communication-helper component 711 of the second layer 710.

At step 765, the second communication-helper component 711 sends the incoming dependency parameters and their values obtained from the primary layer to the second application component 712 of the second layer 710. The second application component 712 of the second layer 710 may then communicate with the first application component 706 of the first layer 705.

Figure 8:
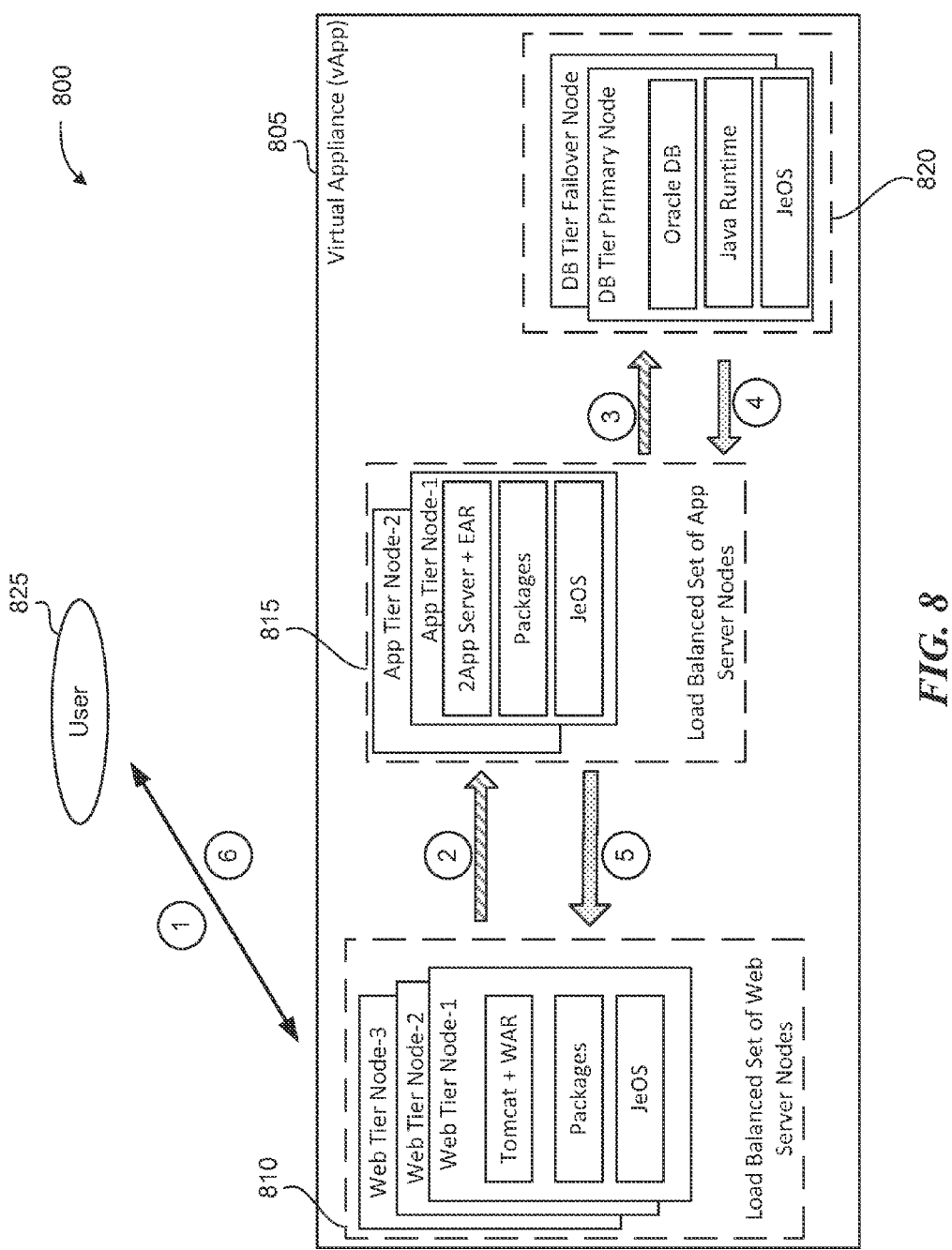
FIG. 8 is a block diagram illustrating a multi-layer vApp.

FIG. 8 is a block diagram illustrating an example 800 of a multi-layer vApp 805. In some embodiments, the multi-layer vApp 805 can be vApp 120 of FIG. 1. The multi-layer vApp 805 can include multiple vApp layers such as a web layer 810, an application layer 815 and a database layer 820, where each of the vApp layers execute as one or more VMs. Each of these vApp layers performs a distinct application. For example, the web layer 810 can generate a user interface, e.g., a web-page, which can be used by a user 825 to interact with an application for which the vApp 805 is generated, e.g., a shopping application. The application layer 815 can include components that contain business logic of the application, e.g., logic to calculate prices of products or service offered for sale by the shopping application. The database layer 820 can include a set of tables where various data associated with the application, e.g., list of products, user information of user 825, etc. can be stored.

In some embodiments, each of the vApp layers execute as one or more VMs. For example, the web layer 810 can execute as a number of nodes, where each node is a VM. Further, in some embodiments, the nodes of the web layer 810 may be load balanced. That is, a particular node that is assigned to serve a request from the user 825 can be determined, e.g., by the vApp 805, based on a load of each of the nodes. In some embodiments, one or more of the nodes is configured as failover nodes. For example, the database layer 820 includes a node which is configured as a primary node and another node as a failover node. A request from the user is typically served by a primary node. The request is assigned to a fail over node if a primary node is unable to serve the request, e.g., when the primary node fails.

The following illustrates a communication between various vApp layers of the vApp 805 to serve a request from the user 825 according to some embodiments.

1=The vApp 805 receives a request from the user 825, e.g., for viewing products of a shopping cart application.
2=The web-layer 810 receives the request, processes the request, e.g., to generate the web page to show the products, and sends the request to the application-layer 815.
3=The application layer 815 processes the request. e.g., identify the user parameters of the request and then request the database layer 820 to provide the products based on the user parameters.
4=The database layer 820 sends the response to the application layer 815, e.g., sends a list of the products.
5=The application layer 815 performs any additional processing that may be necessary, e.g., calculate prices of the retrieved products, and sends the response to the web layer 810.
6=The web layer 810 presents the response to the user 825, e.g., generates a webpage listing the products and their prices.

Figure 9:
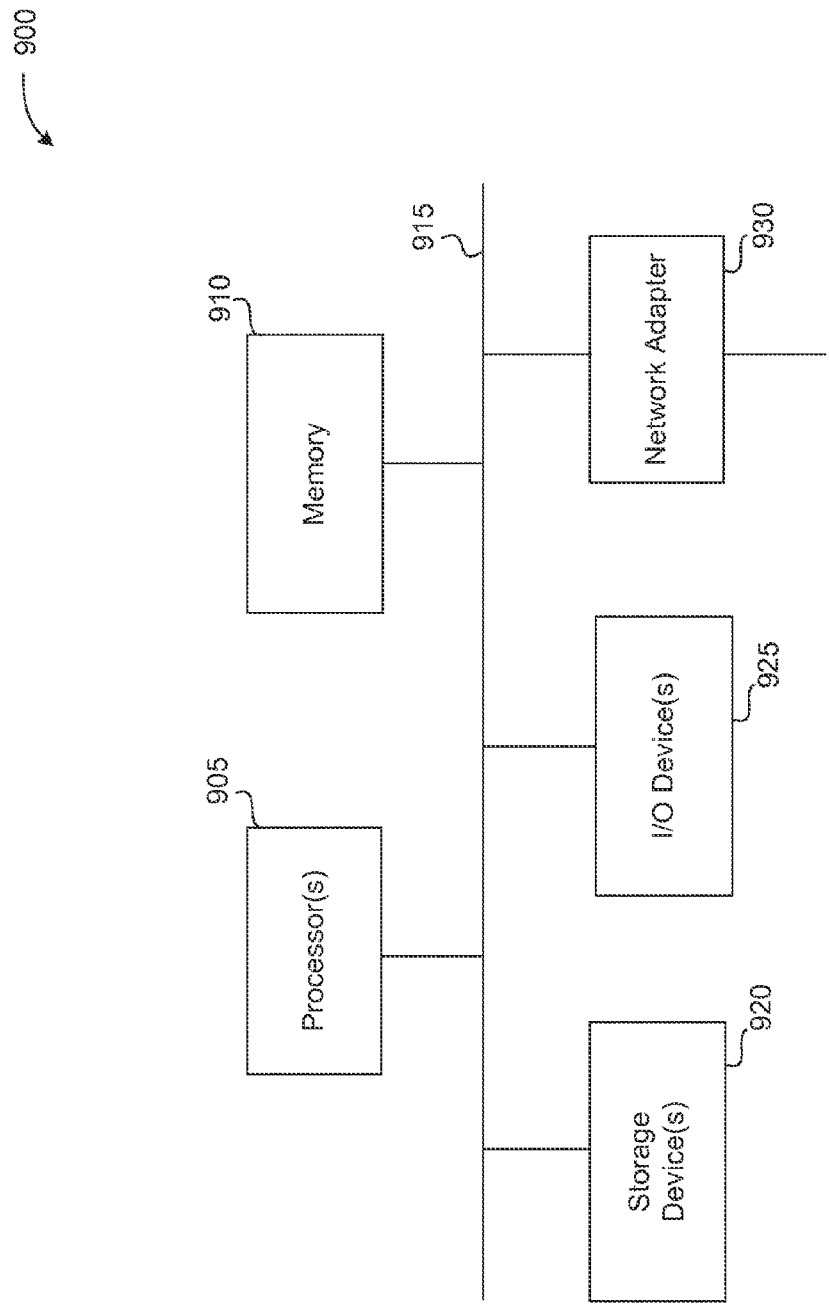
FIG. 9 is a block diagram of a computer system as may be used to implement features of some embodiments.

FIG. 9 is a block diagram of a computer system as may be used to implement features of some embodiments of the disclosed technology. The computing system 900 may be used to implement any of the entities, components or services depicted in the examples of FIGS. 1-8 (and any other components described in this specification). The computing system 900 may include one or more central processing units ("processors") 905, memory 910, input/output devices 925 (e.g., keyboard and pointing devices, display devices), storage devices 920 (e.g., disk drives), and network adapters 930 (e.g., network interfaces) that are connected to an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 910 and storage devices 920 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 910 can be implemented as software and/or firmware to program the processor(s) 905 to carry out actions described above. In some embodiments, such software or firmware may be initially provided to the computing system 900 by downloading it from a remote system through the computing system 900 (e.g., via network adapter 930).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method comprising:
   receiving, at a virtual appliance creation tool ("vApp tool") executing on a computer, an installation manifest of an installation package of an application, the installation package used for installing the application on a computer system;
   analyzing, by the vApp tool, the installation manifest to identify a plurality of application layers of the application, the application layers performing distinct functions of the application;
   determining, by the vApp tool and based on the installation manifest, for each of the application layers, a dependency of each of a plurality of application components in the corresponding application layer, the dependencies being a set of components on which the execution of the application components depends;
   determining, by the vApp tool and for each of the application layers, an operating system with which the application components and their dependencies is compatible, the determining including:
      determining if the application components in the corresponding application layer are compatible with a plurality of operating systems, and
      responsive to determination that the application components are compatible with the plurality of operating systems, determining, based on a best-fit policy defined at the vApp tool, one of the plurality of operating systems as the operating system; and
   generating, by the vApp tool, a virtual appliance for the application, the virtual appliance being executable as a virtual machine on the computer system, the virtual appliance including a plurality of virtual appliance layers, each of the virtual appliance layers including the application components and corresponding dependencies and the operating system of the corresponding application layer.

2. The method of claim 1 further comprising:
   installing, by the vApp tool and based on an appliance definition object of the virtual appliance, the virtual appliance on a hypervisor of the computer system to execute the virtual appliance as the virtual machine.

3. The method of claim 2, wherein the appliance definition object includes a first set of properties of the virtual appliance, the first set of properties including (a) a name of the virtual appliance, (b) a universally unique identifier (UUID) of the virtual appliance, (c) a type of the hypervisor on which the virtual appliance is to be installed, and (d) a location at which the virtual appliance is installed.

4. The method of claim 2, wherein the appliance definition object includes a plurality of virtual appliance layer definition objects corresponding to the virtual appliance layers.

5. The method of claim 4, wherein the each of the virtual appliance layer definition objects includes a second set of properties of the corresponding virtual appliance layer, the second set of properties including (a) an operating system that is compatible with the corresponding virtual appliance layer, (b) the dependencies in the corresponding virtual appliance layer, (c) the application components, and (d) configuration information of the corresponding virtual appliance layer.

6. The method of claim 1, wherein determining the dependency of each of the application components in the corresponding layer includes determining the dependency based on configuration information provided in the installation manifest for a particular application component of the application components.

7. The method of claim 1, wherein determining the dependency of each of the application components in the corresponding application layer includes determining the dependency based on a plurality of dependency policies in the vApp tool that define the dependency for a particular application component of the application components.

8. The method of claim 1, wherein generating the virtual appliance includes generating, by the vApp tool, a plurality of lifecycle scripts, wherein each of the lifecycle scripts is configured to perform a set of operations at a particular stage of execution of the virtual appliance.

9. The method of claim 8, wherein the lifecycle scripts include a first script to perform a first set of operations when the virtual appliance is booted for a first time on a hypervisor of the computer system and a second script to perform a second set of operations when the virtual appliance is booted subsequent to the first time.

10. The method of claim 8, wherein the lifecycle scripts include a first script to perform a set of operations when a user logs in to the virtual appliance for a first time and a second script to perform a second set of operations when the user logs in to the virtual appliance subsequent to the first time.

11. The method of claim 1, wherein generating the virtual appliance includes generating, by the vApp tool, (a) a load-balancing policy having a criterion for balancing a computing load on the virtual appliance and (b) a security policy for defining a criterion for prohibiting access to a plurality of ports of any of the virtual appliance layers to a set of applications.

12. The method of claim 1, wherein generating the virtual appliance includes:
   determining, by the vApp tool, for each of the virtual appliance layers, an incoming dependency and an outgoing dependency of the corresponding virtual appliance layer.

13. The method of claim 12, wherein the incoming dependency is a first set of attributes that the corresponding virtual appliance layer has to obtain from any of a remaining set of the virtual appliance layers to communicate with the any of the remaining set of the virtual appliance layers, and wherein the outgoing dependency is a second set of attributes that any of the remaining set of the virtual appliance layers has to obtain from the corresponding virtual appliance layer to communicate with the corresponding virtual appliance layer.

14. The method of claim 12, wherein generating the virtual appliance includes:
installing, by the vApp tool, a communication helper component into the virtual appliance, the communication helper component enabling communication between the virtual appliance layers of the virtual appliance; and
registering the incoming dependency and the outgoing dependency in the communication helper component.

15. The method of claim 1, wherein generating the virtual appliance includes determining, by the vApp tool, a dependency map for the virtual appliance, the dependency map including a number of incoming dependencies of each of the virtual appliance layers.

16. The method of claim 15 further comprising:
determining, by the vApp tool and based on the dependency map, a start order and a stop order of the virtual appliance layers, the start order being an order in which the virtual appliance layers are executed when deployed on the computer system, the stop order being an order in which an execution of the virtual appliance layers are stopped; and
registering the start order and the stop order in an appliance definition object of the virtual appliance.

17. The method of claim 16, wherein the start order is based on an ascending order of the number of incoming dependencies of the virtual appliance layers, and wherein the stop order is based on a descending order of the number of incoming dependencies of the virtual appliance layers.

18. The method of claim 16 further comprising:
installing, by the vApp tool, the virtual appliance on a hypervisor of the computer system based on the appliance definition object.

19. The method of claim 1, wherein generating the virtual appliance includes:
generating, for each of the virtual appliance layers, a virtual disk image of the operating system,
installing a communication helper component into the virtual appliance, the communication helper component configured to facilitate communication between the virtual appliance layers, and
installing lifecycle scripts into the virtual appliance, the lifecycle scripts performing distinct set of operations at different stages of execution of the virtual appliance.

20. The method of claim 19 further comprising:
generating, by the vApp tool, metadata for the virtual appliance if the virtual appliance is to be installed onto a hypervisor of a first type; and
combining, by the vApp tool, the virtual disk images with the metadata to generate a package of the virtual appliance based on a first virtualization format.

21. A computer-readable storage medium storing computer-readable instructions, comprising:
instructions for analyzing, at a virtual appliance creation tool ("vApp tool"), an installation manifest of an installation package of an application to determine information regarding
a plurality of application components, each of the application components performing a portion of the function of the application,
a dependency of each of the application components, the dependencies being a set of components on which the execution of the application components depends, and
an operating system with which the application components and their dependencies is compatible;
instructions for generating, by the vApp tool, an appliance definition object based on the information; and
instructions for generating, by the vApp tool and based on the appliance definition object, a virtual appliance for the application for execution as a virtual machine on a computer system, the generating the virtual appliance including:
generating a virtual disk image of the operating system,
installing the application components, dependencies and the operating system into the virtual appliance,
installing a communication helper component into the virtual appliance, the communication helper component configured to facilitate communication between the virtual appliance and client devices, and
installing lifecycle scripts into the virtual appliance, the lifecycle scripts performing distinct set of operations at different stages of execution of the virtual appliance.

22. The computer-readable storage medium of claim 21 further comprising:
instructions for generating, by the vApp tool, metadata for the virtual appliance if the virtual appliance is to be installed onto a hypervisor of a first type; and
instructions for combining, by the vApp tool, the virtual disk image with the metadata to generate a package of the virtual appliance based on a first virtualization format.

23. The computer-readable storage medium of claim 21 further comprising:
instructions for installing, by the vApp tool and based on the appliance definition object, the virtual appliance on a hypervisor of the computer system to execute the virtual appliance as the virtual machine.

24. A system, comprising:
a processor;
an installation manifest receiving unit that works in cooperation with the processor to receive an installation manifest of an installation package of an application, the installation package used for installing the application on a computer system;
an installation manifest analyzing unit to analyze the installation manifest to identify a plurality of application layers of the application, the application layers performing distinct functions of the application;
a dependency determination unit to determine, based on the installation manifest, for each of the application layers, a dependency of each of a plurality of application components in the corresponding application layer, the dependencies being a set of components on which the execution of the application components depends;
an operating system determination unit to determine, for each of the application layers, an operating system with which the application components and their dependencies is compatible; and
a virtual appliance generation unit to generate a virtual appliance for the application, the virtual appliance being executable as a virtual machine on the computer system, the virtual appliance including a plurality of virtual appliance layers, each of the virtual appliance layers including the application components and corresponding dependencies and the operating system of the corresponding application layer, the virtual appliance generation unit configured to:
  generate, for each of the virtual appliance layers, a virtual disk image of the operating system,
  install a communication helper component into the virtual appliance, the communication helper component configured to facilitate communication between the virtual appliance layers, and
  install lifecycle scripts into the virtual appliance, the lifecycle scripts performing distinct set of operations at different stages of execution of the virtual appliance.

25. The system of claim 24 further comprising:
a virtual appliance deployment unit to install the virtual appliance on a hypervisor of the computer system to execute the virtual appliance as the virtual machine.

26. The system of claim 24 wherein the virtual appliance generation unit is further configured to:
  generate metadata for the virtual appliance if the virtual appliance is to be installed onto a hypervisor of a first type; and
  combine the virtual disk images with the metadata to generate a package of the virtual appliance based on a first virtualization format.

* * * * *